(No Model.)
T. E. VANDERWERKEN & G. A. HARRISON.
NUT LOCK.
No. 343,743. Patented June 15, 1886.
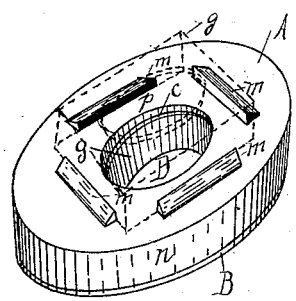
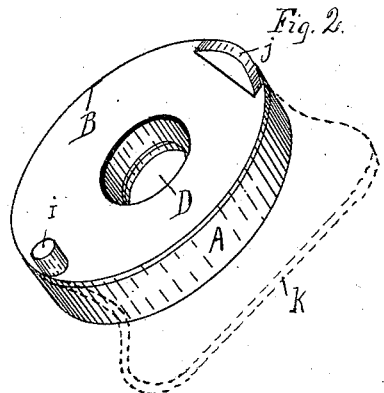
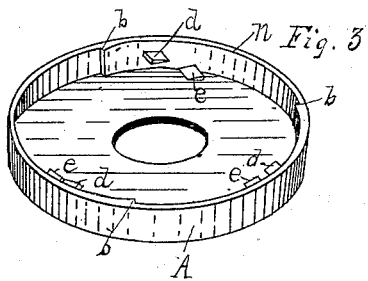
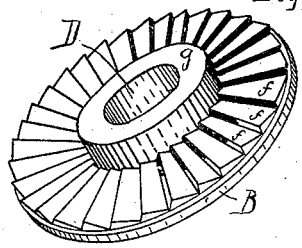
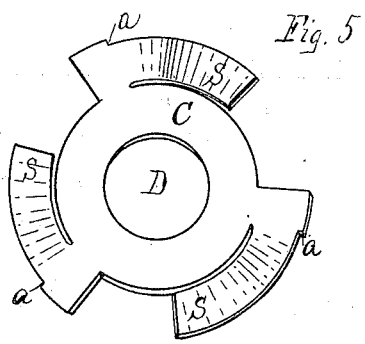
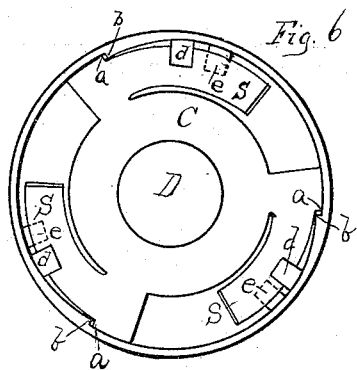
WITNESSES
Geo. A. Darby
John F. Booth
INVENTOR
Theodore E. Vanderwerken
& George A. Harrison
by Geo. A. Mosher
atty.

UNITED STATES PATENT OFFICE.

THEODORE E. VANDERWERKEN, OF GREEN ISLAND, AND GEORGE A. HARRISON, OF TROY, NEW YORK.

NUT-LOCK.

SPECIFICATION forming part of Letters Patent No. 343,743, dated June 15, 1886.

Application filed January 29, 1886. Serial No. 190,154. (No model.)

*To all whom it may concern:*

Be it known that we, THEODORE E. VANDERWERKEN, a resident of Green Island, in the county of Albany and State of New York, and GEORGE A. HARRISON, of the city of Troy, county of Rensselaer, and State of New York, have invented certain new and useful Improvements in Nut-Locks; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in nut-locks, the object of the invention being to secure a threaded nut upon a correspondingly-threaded bolt in such a manner that the nut can be removed from the bolt without injury to the parts, but will not work loose thereon from use.

My invention consists of the novel construction and combination of parts hereinafter fully described, and pointed out in the claims.

Figure 1 of the drawings is a view in perspective of the nut-engaging face of the locking-washer. Fig. 2 is a similar view of the reverse side of the washer. Fig. 4 is a perspective of the inner side of the nut-engaging section of the washer. Fig. 3 is a perspective of the inner side of the other section of the washer. Fig. 5 is a perspective of the spring-pawls. Fig. 6 is a plan view of the inner side of the nut-engaging section with the spring-pawls in place therein.

My invention is especially fitted for use with bolts and nuts employed to secure fish-plates upon the rails of a railway-track, wherein the repeated vibrations induced by passing trains act to cause the nuts to turn upon their bolts and work loose, although it is adapted to secure the nuts upon their bolts when used for other purposes.

My locking-washer is made in two sections, one of which, B, rests upon the fish-plate or other object to be fastened by the bolt and nut, and is provided with a suitable stop or stops, as projections *i* or *j*, to fit into similar depressions or apertures in the fish-plate, or with a lateral projection, *k*, (shown by dotted lines in Fig. 2,) which is simply another kind of stop formed by laterally projecting on one side the rounded edge of plate B, to present an approximately straight edge adapted to come in contact with the flange of the track-rail, by which stop or stops the section is prevented from turning upon the bolt, which passes through the central aperture, D. The other section, A, is provided with the outwardly-projecting flanges *m*, adapted to receive and engage with the nut upon one or more of its sides, one or more of the flanges being employed, as desired, whereby the nut is prevented from turning upon the section A after it comes in contact with one or more of said flanges. The section A is also provided with a rim, *n*, projecting from its reverse or inner side, which supports the equidistant lugs *d e*, projecting therefrom toward the bolt-aperture D, also the stops *b*, to be hereinafter explained. The section B is provided on its inner or reverse side with the projecting boss *g* and ratchet-teeth *f*, surrounding the boss, all of which are adapted to enter and be inclosed by rim *n* on section A. The plate C is made from spring-sheet metal and may be stamped out by a suitable die, producing the central bolt-aperture, D, the projecting springs S, and the stops *a*. The springs S are struck up so that their projecting ends stand out from the plane occupied by the body of the plate C, each spring occupying an inclined plane relatively to the plane of the plate. The plate C is inserted within section A, so as to be inclosed by rim *n* and rest on the inner surface of the section, the springs projecting or inclining outward therefrom, as shown in Fig. 6. The plate is inserted in the section by first dropping it therein, so that the ends of springs S will be just back of the lugs *d*. The projecting ends of the springs are then depressed so they will slide under the lugs *d*, and the plate rotated until the stops *a* on the plate come in contact with the stops *b* on rim *n*, whereupon the parts will occupy the relative positions shown in Fig. 6. Section B is then placed upon section A, so that the boss *g* rests upon the plate C, and the notches or ratchet-teeth *f* come in contact with the projecting ends of the springs S, the edge of section B, which projects out beyond the teeth, lapping over and covering the rim n of section A, the two sections occupying the relative positions shown in Figs. 1 and 2. The apertures D of the several ports coincide and permit of the passage through the same of the bolt P. (Shown in dotted lines in Fig. 1.) The nut g is then screwed onto the projecting end of the bolt. When the nut comes into engagement with the flanges m, the section A turns with the nut until the parts are drawn together as desired. As the section A is turned with the nut to the right the engaging ends of the springs slip over the ratchet-teeth. When the nut is turned on as tightly as desired, the ends of the springs are forced by their natural tension down into the notches between the teeth, and, engaging therewith, prevent the section A and nut from turning backward to work loose. The springs rest upon the small projections e on the inner face of section A, which tends to stiffen the springs and prevent them from buckling when a considerable force is exerted upon the ends of the springs by the ratchet-teeth, as happens when the nut is removed. To remove the nut it is only necessary to forcibly turn the nut backward to the left. The nut takes with it the section A, while the plate C is held stationary by the section B. As the section A turns it carries with it the lugs d, which slide along over the springs S until they reach the projecting ends of the springs and force them out of engagement with the ratchet-teeth, whereupon the sections are unlocked and the ends of the springs travel freely over the teeth without engaging therewith. The friction of the lugs d upon the springs is sufficient to maintain the two sections firmly locked against any tendency to work loose, arising from use, but, as seen from the foregoing, is not sufficient to prevent the forcible unlocking of the sections, which is accomplished without injury to the parts. The engagement of stops a and b prevents the plate C from slipping upon section A when the nut is screwed on. The boss g projects sufficiently from section B to engage with the plate C and force it firmly against section A when the nut is screwed on, thereby relieving the rim n of the pressure of the nut. I am thus able to produce a nut-lock which may be easily locked and unlocked without injury to the parts.

For convenience of reference I style the springs S, which engage with ratchet-teeth f, "spring-pawls."

What I claim as new, and desire to secure by Letters Patent, is—

1. In a sectional nut-lock, the combination of one section provided with a bolt-aperture having a retaining stop or stops on one side and ratchet-teeth upon the opposite side, with a plate having a bolt-aperture and provided with spring-pawls adapted to engage with said ratchet-teeth, and another section provided on one side with a nut engaging stop or stops, and on the opposite side with stops for controlling the movements of said spring-supporting plate, and lugs for disengaging said spring-pawls from said ratchet-teeth, all arranged and operating substantially as and for the purposes set forth.

2. In a nut-lock composed of sections, one having ratchet-teeth, and the other provided with spring-pawls adapted to engage with said teeth, and pawl-disengaging lug d, the strengthening-lugs e, attached to said pawl-carrying section, for the purpose of strengthening said spring-pawls, substantially as described, and for the purposes set forth.

In testimony whereof we have hereunto set our hands this 26th day of January, 1886.

THEODORE E. VANDERWERKEN.
GEO. A. HARRISON.

Witnesses:
GEO. A. MOSHER,
WILLIAM A. VANDERWERKEN.